United States Patent Office 3,492,233
Patented Jan. 27, 1970

3,492,233
LUBRICANT COMPOSITIONS CONTAINING DEHYDROCONDENSATION PRODUCTS
Herbert L. Hepplewhite, Woodbury Heights, and Edward A. Oberright, Woodbury, N.J., assignors to Mobil Oil Corporation, a corporation of New York
No Drawing. Filed Dec. 12, 1967, Ser. No. 689,763
Int. Cl. C10m 1/34, 1/20, 3/28
U.S. Cl. 252—51.5                13 Claims

ABSTRACT OF THE DISCLOSURE

A novel method of formulating industrial organic fluids with one or more products formed by reacting the said fluid with an organic additive, each of which have abstractable hydrogen atoms, in the presence of an organic peroxide. The novel products resulting from this reaction may be added to industrial fluids providing improved high temperature performance. Moreover, the concentration of additives, normally having low solubility in fluids, may be increased therein to provide improved performance.

BACKGROUND OF THE INVENTION

Field of the invention

This invention relates to novel dehydrocondensation products. More particularly, it relates to peroxide-induced dehydrocondensation products of organic compounds useful as additives with organic industrial fluids.

Description of the prior art

In U.S. Patents Nos. 3,205,173 and 3,206,405, improved oils are produced by treating an ester fluid with a ditertiary-alkyl peroxide to produce a thicker fluid than the untreated ester. The resulting product has improved viscosity temperature characteristics. U.S. Patent No. 3,128,246 describes a petroleum lubricating oil treated with an organic peroxide. The resulting oil possesses high temperature stability. In each of these patents, the base fluid is chemically modified. However, the additive must still be physically admixed with the base fluid. As a result, high temperature performance of such fluids is not always consistently effective over extended service periods. Moreover, the additive is often susceptible to chemical deterioration or does not always remain dissolved or uniformly dispersed therein.

SUMMARY OF THE INVENTION

It has now been discovered that organic compounds commonly used as additives in industrial fluids can become chemically attached to an organic fluid base medium. Both the additive and fluid must have abstractable hydrogen atoms for the attachment to occur; and it is preferred that the additive be free of ethylenic unsaturation. By heating the additive and an organic base fluid together in the presence of an organic peroxide the additive becomes joined to the molecule of the base fluid in a dehydrocondensation reaction without loss of additive performance. In fact, performance is improved because the additive retains its properties at extremely high temperatures. The resulting dehydrocondensed product can be used as modified base fluid itself, since the additive is present as part of the fluid molecule, or as an additive in either a different base fluid or in further amounts of the same base fluid.

DESCRIPTION OF SPECIFIC EMBODIMENTS

The method of this invention requires mixing the fluid and additive together and then adding the peroxide to the mixture. Alternatively, the peroxide can be premixed with one of the reactants. It is preferred, however, that both reactants be present together when the heating step is performed. The temperature is that required to decompose the peroxide. Generally, a temperature in the range of from 30° to about 300° C. is sufficient to achieve reaction.

The products of this invention have increased high temperature stability, greater than mere mechanical mixtures of the additive in the fluid. Additives which may be used in this invention also include those normally having poor solubility in most industrial fluids. The product obtained by reacting the fluid and a poorly soluble additive together under the conditions of this invention may be dissolved in further amounts of the fluid, to such an extent that concentrations of the additive hitherto unobtainable are now possible. However, it is presently believed that the major reason for the improved performance of additives is that they are part of the molecule of the fluid, not merely physically dissolved in the fluid.

Also contemplated in this invention is the use of mixed additives being attached to the molecule of the base fluid. Hence, instead of resorting to the old manner of blending several additives into a fluid, a number of such modified fluids each containing one or more additives for a different characteristic or property chemically combined therewith may be provided. Thus a fluid molecule may be chemically bonded to one or more molecules of an antioxidant or of an antioxidant and a load-carrying additive, or a detergent. This modified fluid may in turn be combined with another modified fluid or unmodified fluid to produce a new and improved fluid. Or, in some cases, the modified fluid may be used alone.

The only chemical characteristic required for the fluids and the additives is that they both possess at least one abstractable hydrogen atom. The peroxide-treatment is believed to produce a cross-dehydrocondensation product as the essential ingredient. Although the reaction mixture may contain a mixture of other products, since unreacted compounds and dimeric or other polymeric form of each reactant may be present as well as the cross-dehydrocondensed product, it is this last product that is believed to contribute to the unexpected improvements found by this invention. Hence, the entire reaction mixture may be used as the additive. Separation of the cross-dehydrocondensed product from the reaction mixture may be carried out, but this step is unnecessary.

The additives which may be used in this invention, may be liquid or solid (containing no ethylenic unsaturation), which include antioxidants, load-carrying agents, detergents, anticorrosion agents, and the like.

The fluids useful in this invention are organic media which include lubricating oils, fuels, hydraulic fluids, transmisson fluids, pastics, rubbers, and the like. Some solids may enter the dehydrocondensation reaction while in a molten state or while dissolved in an inert solvent. Such fluids as mineral oils, synthetic ester oils, polyolefins, acetals and the like may be employed, preferably without ethylenic unsaturation.

The organic peroxides which may be used in this invention may be any di-organo peroxide or mono-organo hydroperoxide which breaks down upon application of energy, such as heat, to provide free radicals. The alkyl group may contain from 1 to about 20 carbon atoms, and preferably 2 to 10. The tertiary alkyl peroxides are particularly desirable. These include ditertiary-butyl peroxide, di-tertiary-amyl peroxide, di-tertiary-octyl peroxide, tertiary-amyl hydroperoxide, tertiary-butyl hydroperoxide, tertiary-octyl hydroperoxide, and the like.

One of the preferred reaction systems of this invention is the reaction of a synthetic ester fluid with an organic antioxidant. Improved antioxidant properties may thus be obtained by adding to a synthetic ester base fluid a novel dehydrocondensation product produced by heating in the presence of the organic peroxide (1) a secondary aromatic amine or a hydroxyaromatic antioxidant wherein the aromatic portion is phenyl, naphthyl, diphenyl dinaphthyl and alkyl substituted derivatives thereof, wherein the alkyl groups may have from 1 to about 20 carbon atoms, either alone or with another such antioxidant, and (2) an ester fluid.

The aromatic amines which may be used to illustrate one aspect of this invention include compounds of the structure

wherein Ar is phenyl, naphthyl, diphenyl dinaphthyl, and alkyl derivatives thereof having 1 to about 20 carbon atoms, and R is alkyl, aralkyl, aryl, and alkaryl having from 1 to about 20 carbon atoms. Typical antioxidants are diphenylamine, dinaphthylamine, phenyl-alpha-naphthylamine, phenyl-beta-naphthylamine, butyl-alpha-naphthylamine, ditolylamine, phenyltolylamine, tolylnaphthylamine, dioctyl diphenylamine, hexylphenylamine, butyl-naphthylamine, and the like. These amines are reacted with the ester fluid in the presence of the peroxide. Although it is not known with certainty, it is theorized that the N-hydrogen atom acts as the situs of the reaction, forming a new nitrogen linkage with the ester.

The hydroxyaromatic antioxidant includes phenols, naphthols, bisphenols, dihydroxy naphthols, dihydroxyphenols, trihydroxyphenols, mono- and dihydroxyanthracenes and hydroxy anthraquinones and alkyl, aralkyl, aryl and alkaryl derivatives thereof containing from 6 to 30 carbon atoms. Such phenol antioxidants as 4-tertiary-butyl catechol, 2,4 - ditertiary - butyl-paracresol, 2,4-ditertiary-butyl-4-methyl phenol, 4,4'-methylenebis-(2,6-ditertiary-butyl phenol), hexyl gallate, and the hydroxy-anthraquinone derivatives may be used. Preferred are the dihydroxy anthraquinones, such as the 1,2; 1,3; 1,4; 1,5; and 1,8 isomers. The 1,4-dihydroxyanthraquinone, quinizarin, is of special interest.

The ester fluids which may be used in this invention are esters produced from monohydroxy alcohols and monocarboxylic acids, from polyhydroxy alcohols and monocarboxylic acids or from monohydroxy alcohols and dicarboxylic acids. Each of the alcohols and acids used in preparing the ester may contain from 1 to 4 functional groups thereby producing mono-, di-, tri-, and tetraesters. Contemplated within this invention are esters of alcohols, diols, triols, and pentaerythritols having from 2 to 20 carbon atoms, and mono- and dicarboxylic acids having from 2 to about 20 carbon atoms and preferably 4 to 12.

The esters of this invention may include the mono-esters octyl acetate, decyl acetate, octadecyl acetate, methyl myristate, butyl stearate, methyl oleate, and the like and the polyesters dibutyl phthalate, di-octyl adipate, di-2-ethylhexyl azelate, di-2-ethylhexyl sebacate, and the like.

The most preferred esters are produced from hindered or neopentyl alcohols, that is, those in which the beta carbon atom is completely substituted by other carbon atoms. These esters have the structure

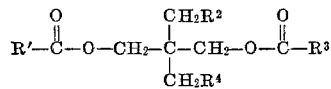

wherein each of R' and R³ is alkyl or aryl of 1 to 19 carbon atoms and each of R² and R⁴ is hydrogen, alkyl of 1 to 5 carbon atoms or

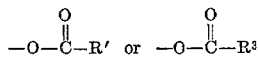

and each of the R' and R³ groups and R² and R⁴ groups may be the same or different. Such esters include 2,2-dimethylpropane-1,3-diol dipelargonate, trimethylolpropane trioctanoate, trimethylolpropane tridecanoate, trimethylolbutane trihexanoate, pentaerythrityl tetraoctanoate and pentaerythrityl tetradodacanoate. Mixtures of acids may be used in producing the di-, tri- and tetraesters.

For example, a preferred pentaerythritol ester contains a mixture of $C_4$ through $C_{10}$ acids. The esters which may be dehydrocondensed in accordance with this invention, therefore, include any ester fluid having an abstractable hydrogen atom, although preferred fluids are esters of trimethylolpropane and pentaerythritol.

As indicated previously, the order of combining the reactants is not critical, so long as the heating occurs when the additive and fluid are together at the time peroxide is present in the reaction mixture.

The concentration of the additive in the base fluid may vary. In the case of the amine or phenol in the ester fluid, about 0.05% to about 95% by weight of additive may be reacted with the ester. The amount of peroxide may range from about 1% to about 50% by weight of the liquid reaction mixture and preferably about 15 to 50%. The reaction mixture is heated in a suitable reactor, preferably under reflux conditions. If desired, an inert organic solvent may also be present to control the temperature and to assure intimate mixing of the reactants. The only by-product which must be removed from the reaction product is the alcohol formed by the decomposition of the peroxide. The remaining product is usually a viscous liquid or a solid substance. This product may then be used as a modified base fluid itself or as a component in a synthetic ester formulation. The synthetic ester medium moreover, need not be the same as the ester that is used in the dehydrocondensation reaction. Thus a pentaerythritol ester reacted with the antioxidant can be subsequently added to a trimethylolpropane ester fluid composition.

The amount of dehydrocondensed additive to be added to the ester formulation may range from about 0.05% to about 25% by weight. The dehydrocondensed products provided improved antioxidant performance compared to the untreated aromatic amine.

The invention may be more clearly illustrated by the following examples:

Example 1

In a suitable reactor were mixed 50 grams of a pentaerythritol tetraester of a mixture of isovaleric and pelargonic acids and 50 grams of phenyl-alpha-naphthylamine. The reaction mixture was heated to 140° C. At this temperature, 34 grams of ditertiarybutyl peroxide were added dropwise to the mixture. After the addition of the peroxide, the mixture was maintained at 130° C. to 140° C. for four hours under reflux conditions. Thereafter, the mixture was allowed to cool. Volatile products of the reaction, consisting mainly of tertiary butyl alcohol, were stripped from the reaction mixture to about 175° C. and 150 mm. Hg. The product was a homogeneous viscous liquid of dark blue color.

Example 2

In equipment similar to that used in Example 1, 25 grams of di-n-octyl diphenylamine, and 25 grams of the pentaerythritol ester of Example 1 were heated to 150° C. and stirred while 25 grams of di-t-butyl peroxide were added dropwise. Upon completion of the peroxide addition, the mixture was maintained at 130° C. to 140° C. for four hours under reflux conditions. The reaction vessel was allowed to cool and the volatile products were stripped from the reaction product at 175° C. and 50 mm. Hg. The product was a solid material.

Example 3

In equipment similar to that used in Example 1, 24 grams of quinizarin and 108 grams of the pentaerythritol ester of Example 1 were mixed together and heated to 150° C. As the heated mixture was stirred, 29 grams of di-t-butyl peroxide were added dropwise. At the completion, the reaction mixture was refluxed at 130° to 140° C. for 8 hours. Thereafter, the reaction mixture was stripped to 175° C. and about 50 mm. Hg. The product was a deep red, homogeneous liquid.

Evaluations (A) The products of Examples 1, 2 and 3 were tested as additives in the same pentaerythritol ester described in Example 1 in the Panel Coker Test. In this test, the test sample fluid is splashed onto a tared metal panel, maintained at a temperature of 800° F. in the presence of air for a period of eight hours. The test fluid is permitted to run off the panel. At the end of eight hours, the panel is weighed. The rating for the Panel Coker Test is the weight of solid deposit left on the panel by the test fluid; the lower the weight the higher degree of high-temperature stability.

The following results were obtained:

Test fluid (concentration by weight): Deposit, mgs.
- (1) Base ester alone _____ 523
- (2) Base ester+2% PAN [1] _____ 610
- (3) Base ester+4% of the Example 1 product _ 188
- (4) Base ester+2% DOP [2] _____ 457
- (5) Base ester+2% of the Example 2 product _ 298
- (6) Base ester+5.5% of the Example 3 product _____ 162

[1] Phenyl-alpha-naphthylamine.
[2] Di-n-octyl diphenylamine.

The above results show that the dehydrocondensed products containing amines (items 3 and 5) are more effective than the amines alone at the same amine concentration (items 2 and 4).

(B) A composition using as the base fluid the pentaerythritol ester described in Example 1 and containing a number of additives, such as a load-carrying agent, antioxidant, antifoam agent, metal suppressant, the total amounting to 4.125% by weight and 1% by weight of phenyl-alpha-naphthylamine is tested in an oxidation corrosion test. This test is conducted at 500° F. for 24 hours, in which a stream of air is passed through the test composition at 5 liters per hour. Metals present in the test include aluminum, silver, copper, steel and titanium. These metals are weighed before and after the test to determine the extent of weight loss due to corrosion. In a second oxidation corrosion test, the 1% phenyl-alpha-naphthylamine is replaced by 2% by weight of the product of Example 1. The increase in the kinematic viscosity of the test oil at 100° F., the increase in the neutralization number (NN) in mg. of KOH/gm. of sample employed and metal corrosion are measured. The results of these measurements are reported below:

| Test oil | Viscosity increase, percent | NN increase | Metal weight loss |
|---|---|---|---|
| Oil+1% PAN* | 40 | 8.5 | None |
| Oil+2% Example 1 Product | 33 | 2.4 | None |

*Phenyl-alpha-napthyamine.

The results of the above tests show that the aromatic amine or the phenol additives, when subjected to dehydrocondensation in the presence of organic peroxides with an ester fluid, provides better high temperature performance when subsequently added to a synthetic ester oil formation than the additive in the untreated state.

Another benefit obtained from the discovery of this invention is the ability to dissolve in a base fluid an additive of low solubility. Quinizarin, for example, is only soluble in the ester of Example 1 to the extent of less than 0.1%. The fluid of Example 3, contains an equivalent amount of about 1%. At this concentration, very little of the quinizarin mechanically mixed into the ester fluid could be utilized. The result of the Panel Coker Test would be almost as high as the base fluid result. Yet the result of the test for item 6 shows about a threefold reduction in deposits of the ester alone.

A dehydrocondensation product of one ester may be added to a different ester base fluid.

Example 4

In a reactor similar to that used in Examples 1 and 2 are added 50 grams of di-2-ethylhexylsebacate and 10 grams of diphenylamine. The mixture is heated to a temperature of about 130° C. and 5 grams of di-t-amyl peroxide is added gradually. The reaction mixture is held at this temperature for four hours. The alcohol is removed by distillation under vacuum. The remaining product is a viscous liquid. This liquid is added to trimethylolpropane trioctanoate lubricant in a concentration of about 5% by weight.

Example 5

In a reactor similar to that used in Example 1, is prepared a fluid mixture consisting of 80% by weight of the pentaerythritol ester of Example 1 and 20% by weight of phenyl-beta-naphthylamine. Added to this mixture is 17% by weight of the mixture of di-t-butyl peroxide at a temperature of about 120° to 130° C. for four hours. The alcohol is removed by distillation under vacuum.

The resulting liquid is added to the same pentaerythritol ester at a concentration of 5% by weight. This is equivalent to 1% by weight of phenyl-alpha-naphthylamine in untreated ester. The sample is tested in an oxidation wherein a stream of air is blown through a heated sample at the rate of 5 liters per hour for 24 hours. The temperature of the sample is 450° F. Present in the sample are: 15.6 sq. in. of sandblasted iron wire, 0.78 sq. in. of polished copper wire, 0.87 sq. in. of polished aluminum wire and 0.167 sq. in. of polished lead surface. The neutralization number (NN) and the kinetic viscosity at 100° F. sample are measured before and after the test. The same fluid containing 1% of phenyl-alpha-naphthylamine and 1% di-n-octyl diphenylamine together is also tested for comparison.

The results of the test are as follows:

| | Test sample | Comparison sample |
|---|---|---|
| Change in NN | 1.9 | 6.7 |
| Viscosity increase | 44 | 128 |
| Loss in weight of lead sample, gms | 11 | 17 |

The results of these tests show that the ester containing the dehydrocondensed product is superior to an ester containing antioxidants physically admixed therein.

Example 6

Following the procedure of Example 1, using similar concentrations of components, a reaction mixture of 2,2-dimethyl-1,3-propanediol didecanoate and an equal amount by weight of phenyl-alpha-naphthylamine and dioctyl diphenylamine is heated in the presence of n-butyl hydroperoxide. The product when added to the pentaerythritol ester of Example 1 at a concentration of about 5% by weight provides improved stability thereto.

Example 7

Following the procedure of Example 1, using the same concentrations of components, a reaction mixture of pentaerythrityl tetracaproate and 2,6-ditertiary-butyl-4-methyl phenol is heated in the presence of di-tertiary-butyl peroxide. The product when added to the pentaerythritol ester of Example 1 at a concentration of about 5% by weight provides improved stability thereto.

Although the invention has been illustrated herein by means of specific examples and embodiments thereof, it is not intended that the scope of the invention be limited in any way except as stated by the following claims.

We claim:

1. A lubricant composition comprising a major proportion of a member of the group consisting of lubricating oils, hydraulic fluids and transmission fluids and a minor amount sufficient to impart improved stability properties thereto of a product prepared by reacting a member selected from mineral oils, synthetic ester oils and polyolefin fluids having at least one abstractable hydrogen atom with from about 0.05% to about 95% by weight thereof of an additive selected from (1) the amines of the formula

wherein Ar is selected from phenyl, naphthyl, diphenyl, dinaphthyl, and the alkyl-substituted derivatives of these wherein the said alkyl has from 1 to about 20 carbon atoms, R is selected from alkyl, aralkyl, aryl and alkaryl having from 1 to about 20 carbon atoms, and (2) hydroxyaromatic compounds selected from phenol, naphthol, bisphenol, dihydroxynaphthol, dihydroxyphenol, trihydroxyphenol, monohydroxyanthracene, dihydroxyanthracene and the substituted members of these wherein the substituents have from 6 to 30 carbon atoms and are selected from alkyl, aryl, aralkyl, and alkaryl, in the presence of an organic peroxide at a temperature sufficient to decompose said peroxide.

2. The composition of claim 1 wherein the amine is a diaryl amine.

3. The composition of claim 2 wherein the amine is a phenylnaphthylamine.

4. The composition of claim 3 wherein the amine is N-phenyl-alpha-naphthylamine.

5. The composition of claim 2 wherein the amine is dioctyl diphenylamine.

6. The composition of claim 1 wherein the said hydroxyaromatic compound is a hydroxylated anthraquinone.

7. The composition of claim 1 wherein the said organic peroxide is a di-tertiary-alkyl peroxide.

8. The composition of claim 7 wherein the di-tertiary-alkyl peroxide is di-tertiary-butyl peroxide.

9. The composition of claim 1 wherein the lubricant base is a synthetic ester base oil.

10. The composition of claim 9 wherein the ester base oil is a pentaerythritol ester.

11. The composition of claim 10 wherein the oil is an ester of pentaerythritol and a monocarboxylic acid containing from 2 to 20 carbon atoms.

12. The composition of claim 11 wherein the oil is an ester of pentaerythritol and a mixture of valeric and pelargonic acids.

13. The composition of claim 9 wherein the ester oil is a trimethylolpropane ester.

References Cited

UNITED STATES PATENTS

| | | |
|---|---|---|
| 2,370,943 | 3/1945 | Dietrich. |
| 2,584,968 | 2/1952 | Catlin. |
| 2,613,184 | 10/1952 | Catlin. |
| 3,032,538 | 5/1962 | Spaulding et al. _____ 252—56 |
| 3,303,131 | 2/1967 | Low et al. |

DANIEL E. WYMAN, Primary Examiner

W. J. SHINE, Assistant Examiner

U.S. Cl. X.R.

252—50, 52, 73, 77, 79

PO-1050
(5/69)

UNITED STATES PATENT OFFICE
CERTIFICATE OF CORRECTION

Patent No. 3,492,233　　　　　　Dated　January 27, 1970

Inventor(s)　Herbert L. Hepplewhite and Edward A. Oberright

It is certified that error appears in the above-identified patent and that said Letters Patent are hereby corrected as shown below:

Column 2, line 53, "pastics" should read --plastics--.

Column 5, line 55, "Phenyl-alpha-napthyamine" should read --Phenyl-alpha-naphthylamine--.

Column 5, line 62, "formation" should read --formulation--.

SIGNED AND
SEALED
JUL 7 1970

(SEAL)
Attest:

Edward M. Fletcher, Jr.
Attesting Officer

WILLIAM E. SCHUYLER, JR.
Commissioner of Patents